(12) United States Patent
Liu

(10) Patent No.: US 8,109,003 B2
(45) Date of Patent: Feb. 7, 2012

(54) PRUNING SHEARS

(75) Inventor: Mei-Chih Liu, Taichung (TW)

(73) Assignee: Success & Tech Industrial Co., Ltd., Taichung (TW)

( * ) Notice: Subject to any disclaimer, the term of this patent is extended or adjusted under 35 U.S.C. 154(b) by 256 days.

(21) Appl. No.: 12/606,176

(22) Filed: Oct. 26, 2009

(65) Prior Publication Data

US 2010/0037470 A1 Feb. 18, 2010

Related U.S. Application Data

(63) Continuation-in-part of application No. 12/213,840, filed on Jun. 25, 2008, now abandoned.

(51) Int. Cl.
*B26B 13/00* (2006.01)
*B26B 13/04* (2006.01)
(52) U.S. Cl. .............................. 30/236; 30/254; 30/261
(58) Field of Classification Search ................ 30/175, 30/186–188, 194, 236, 244, 249, 251, 254, 30/258, 260–262, 341
See application file for complete search history.

(56) References Cited

U.S. PATENT DOCUMENTS

| | | | | | |
|---|---|---|---|---|---|
| 62,737 | A | * | 3/1867 | Doolittle | 30/262 |
| 671,231 | A | * | 4/1901 | Poindexter | 30/261 |
| 1,287,637 | A | * | 12/1918 | Cobb | 30/262 |
| 1,438,374 | A | * | 12/1922 | Guerrero | 30/260 |
| 1,597,859 | A | * | 8/1926 | Jardine | 30/262 |
| 1,741,109 | A | * | 12/1929 | Heimerdinger | 30/262 |
| 2,207,222 | A | * | 7/1940 | McGary | 30/251 |
| 2,532,359 | A | * | 12/1950 | Drmic | 30/258 |
| 2,638,669 | A | * | 5/1953 | Steede | 30/262 |
| 2,715,270 | A | * | 8/1955 | Oxhandler | 30/262 |
| 2,801,468 | A | * | 8/1957 | Anderson | 30/254 |
| 3,416,226 | A | * | 12/1968 | Pfaffenbach | 30/261 |
| 3,559,286 | A | * | 2/1971 | Pfaffenbach | 30/261 |
| 3,562,908 | A | * | 2/1971 | Rogers | 30/261 |
| 4,073,059 | A | * | 2/1978 | Wallace et al. | 30/261 |
| 4,079,514 | A | * | 3/1978 | Arlett | 30/261 |
| 4,156,311 | A | * | 5/1979 | Wallace et al. | 30/262 |
| 4,336,652 | A | * | 6/1982 | Robertson | 30/258 |
| 4,341,016 | A | * | 7/1982 | Harrison et al. | 30/262 |
| 5,377,412 | A | * | 1/1995 | Schofield et al. | 30/262 |
| 5,551,157 | A | * | 9/1996 | Wu | 30/341 |
| 5,930,900 | A | * | 8/1999 | Chang | 30/262 |
| 5,987,755 | A | * | 11/1999 | Shih | 30/262 |
| 6,282,995 | B1 | * | 9/2001 | Lin | 30/341 |
| 6,336,272 | B1 | * | 1/2002 | Lee | 30/262 |
| 6,418,626 | B1 | * | 7/2002 | Jang | 30/262 |

(Continued)

FOREIGN PATENT DOCUMENTS

FR 2631777 A1 * 12/1989

*Primary Examiner* — Jason Daniel Prone

(57) ABSTRACT

Pruning shears include a first arm including a first handle and a jaw including a first tab; a first blade including a cutting edge and an ear opposite the cutting edge and having a first through hole wherein the first arm and the first blade are secured together by inserting the first tab into the first through hole; a second arm including a second handle and a joining section; a second blade secured to the joining section; a pivot joint for pivotably securing the first arm to the second arm; and a torsion spring positioned between the first arm and the second arm. The torsion spring exerts an expansion force to push the first arm and the second arm apart from each other.

4 Claims, 4 Drawing Sheets

U.S. PATENT DOCUMENTS

| | | | |
|---|---|---|---|
| 6,598,300 B2 * | 7/2003 | Huang | 30/262 |
| 6,625,888 B2 * | 9/2003 | Heck et al. | 30/186 |
| 6,634,105 B2 * | 10/2003 | Lindermeir | 30/135 |
| 6,643,937 B1 * | 11/2003 | Wu | 30/262 |
| 6,739,217 B2 * | 5/2004 | Hartranft et al. | 30/262 |
| 6,752,054 B2 * | 6/2004 | Knight | 30/251 |
| 6,772,520 B1 * | 8/2004 | Shih | 30/251 |
| 6,860,018 B2 * | 3/2005 | Schneider et al. | 30/262 |
| 7,178,245 B1 * | 2/2007 | Lee | 30/254 |
| D600,080 S * | 9/2009 | Liu | D8/5 |
| 2001/0002515 A1 * | 6/2001 | Mock | 30/254 |
| 2002/0023355 A1 * | 2/2002 | Fujita | 30/254 |
| 2006/0191142 A1 * | 8/2006 | Jou | 30/262 |
| 2007/0144015 A1 * | 6/2007 | Peterson et al. | 30/262 |
| 2009/0151170 A1 * | 6/2009 | Lee et al. | 30/341 |
| 2009/0320300 A1 * | 12/2009 | Liu | 30/262 |

* cited by examiner

PRUNING SHEARS

CROSS-REFERENCE TO RELATED APPLICATIONS

This application is a continuation-in-part of U.S. application Ser. No. 12/213,840 filed Jun. 25, 2008, now abandoned.

BACKGROUND OF THE INVENTION

1. Field of Invention

The invention relates to pruning shears and more particularly to such a pair of pruning shears with improved characteristics including increased structural strength, prolonged period of use time, and being adapted to operate smoothly.

2. Description of Related Art

A conventional type of pruning shears is shown in FIG. 1. The shears have two arms 1 pivotably interconnected by means of a pivot joint (not numbered), a helical compression spring 3 positioned between the arms 1, and two cutting jaws 2 in which one jaw 2 has a notch 4. In a cutting operation, a plant material (e.g., a flower stalk, a branch, etc.) is introduced into a shear opening of the open shears and the shears are slowly closed for cutting through the material.

The provision of the notch 4 can facilitate the holding of the plant material in the shear opening. However, it also decreases the structural strength of the jaws 2. The jaws 2 are thus subject to break after a period time of use. Further, its cutting operation is not smooth because the cut plant may interfere with the arms 1.

Another conventional type of pruning shears is shown in FIG. 2. The shears have two arms 5 pivotably interconnected by means of a pivot joint (not numbered), a compression spring 7 positioned between the arms 5, and two cutting jaws 6. One jaw 6 has a through hole (not shown) and the front end of one arm 5 has a through hole 9. A fastener (e.g., screw) 8 is driven into both through holes 9 to secure the jaw 6 and the arm 5 together.

However, the provision of the through holes can decrease the structural strength of the shears. The shears are thus subject to break after a period time of use.

There have been numerous suggestions in prior patents for pruning shears. A pertinent prior art of which this inventor is aware is U.S. Pat. No. 6,634,105.

A need remains for a pair of improved pruning shears in order to contribute significantly to the advancement of the art.

SUMMARY OF THE INVENTION

It is therefore one object of the invention to provide a pair of pruning shears with increased structural strength, prolonged period of use time, and being adapted to operate smoothly.

To achieve the above and other objects, the invention provides pruning shears (100) comprising a first arm (10) comprising a first handle (11) and an integral jaw (12) including a first tab (123); a first blade (30) including a cutting edge (33) and an ear (34) on an edge opposite the cutting edge (33), the ear (34) including a first through hole (32) wherein the first arm (10) and the first blade (30) are secured together by inserting the first tab (123) into the first through hole (32); a second arm (20) comprising a second handle (21) and an integral joining section (22); a second blade (40) secured to the joining section (22) and being disposed on the cutting edge (33) in an inoperative position of the shears (100); a pivot joint (50) for pivotably securing the first arm (10) to the second arm (20); and a torsion spring (60) positioned between the first arm (10) and the second arm (20), wherein the torsion spring (60) exerts an expansion force to push the first arm (10) and the second arm (20) apart from each other until the first blade (30) and the second blade (40) are engaged together with a gap existing between the cutting edge (33) and the second blade (40).

In a first aspect of the invention the first handle (11) comprises a cylindrical projection (111), wherein the second handle (21) comprises a cylindrical protrusion (211) projecting toward the projection (111), and wherein the torsion spring (60) has one end securely put on the projection (111) and the other end securely put on the protrusion (211).

In a second aspect of the invention there is provided a locking member (70) including two latches (71) extending from an inner surface, and wherein the first handle (11) comprises a latch cavity (112) at the joining portion of the first handle (11) and the jaw (12), the latch cavity (112) being adapted to pivotably receive the latches (71) so that the locking member (70) pivotably mounts in the latch cavity (112) for limiting a pivotal movement of the first arm (10) about the second arm (20) and maintaining the first blade (30) and the second blade (40) in a partial covering relationship.

In a third aspect of the invention the jaw (12) comprises a flat recess (121) and an arm-shaped actuating section (124) extending from the flat recess (121), and wherein the first blade (30) is seated upon the flat recess (121) and has a portion of one edge opposing the cutting edge (33) being urged by an inner surface of the actuating section (124) for positioning the first blade (30).

In a fourth aspect of the invention the first tab (123) is formed on the actuating section (124), wherein the flat recess (121) comprises a second tab (125) and a through aperture (122) proximate to the second tab (125), and wherein the first blade (30) further comprises a second through hole (31) aligned with the through aperture (122), and a third through hole (35) besides the second through hole (31) with the second tab (125) fastened therein.

In a fifth aspect of the invention the first blade (30) is opposite the actuating section (124).

In a sixth aspect of the invention the second blade (40) comprises a slot (42), and wherein the joining section (22) comprises a protuberance (223) fitted into the slot (42) for securing the second arm (20) to the second blade (40).

The above and other objects, features and advantages of the invention will become apparent from the following detailed description taken with the accompanying drawings.

DETAILED DESCRIPTION OF THE INVENTION

Figure 1:
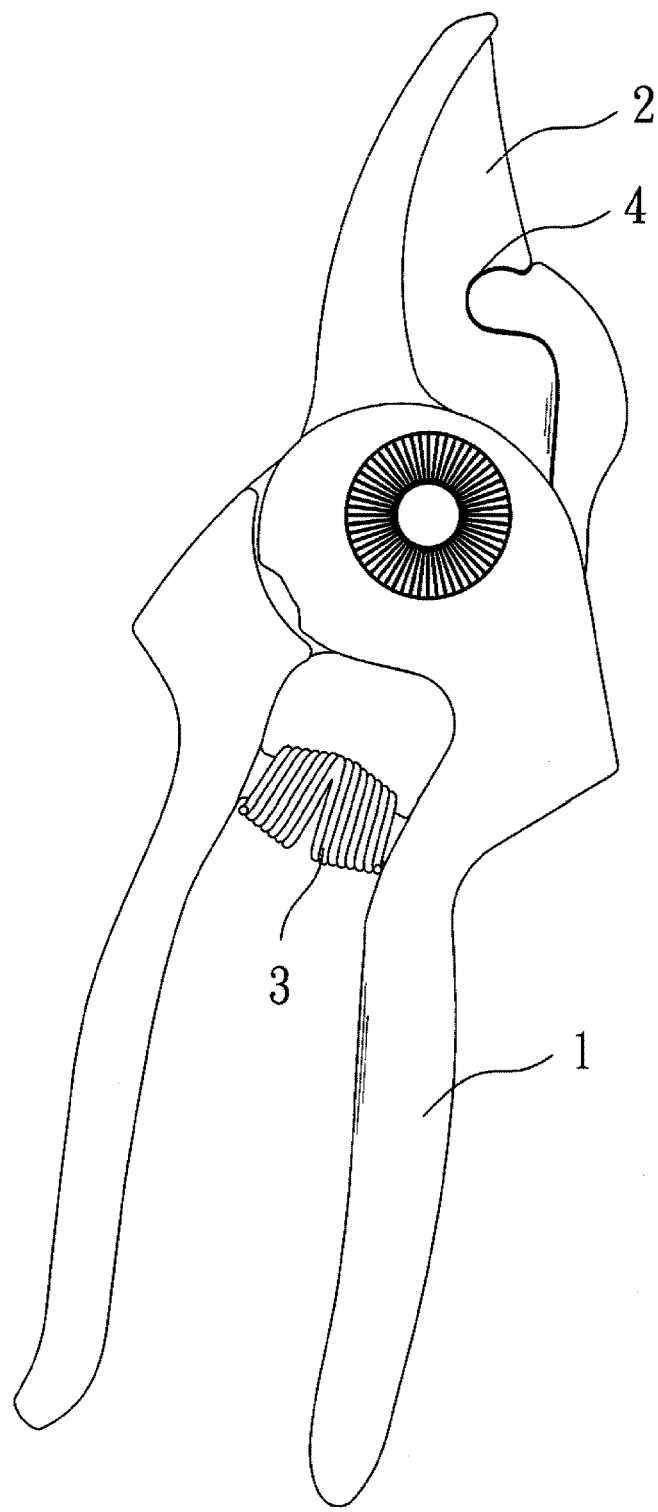
FIG. 1 is a side elevation of a conventional pruning shears in a closed position.
Figure 2:
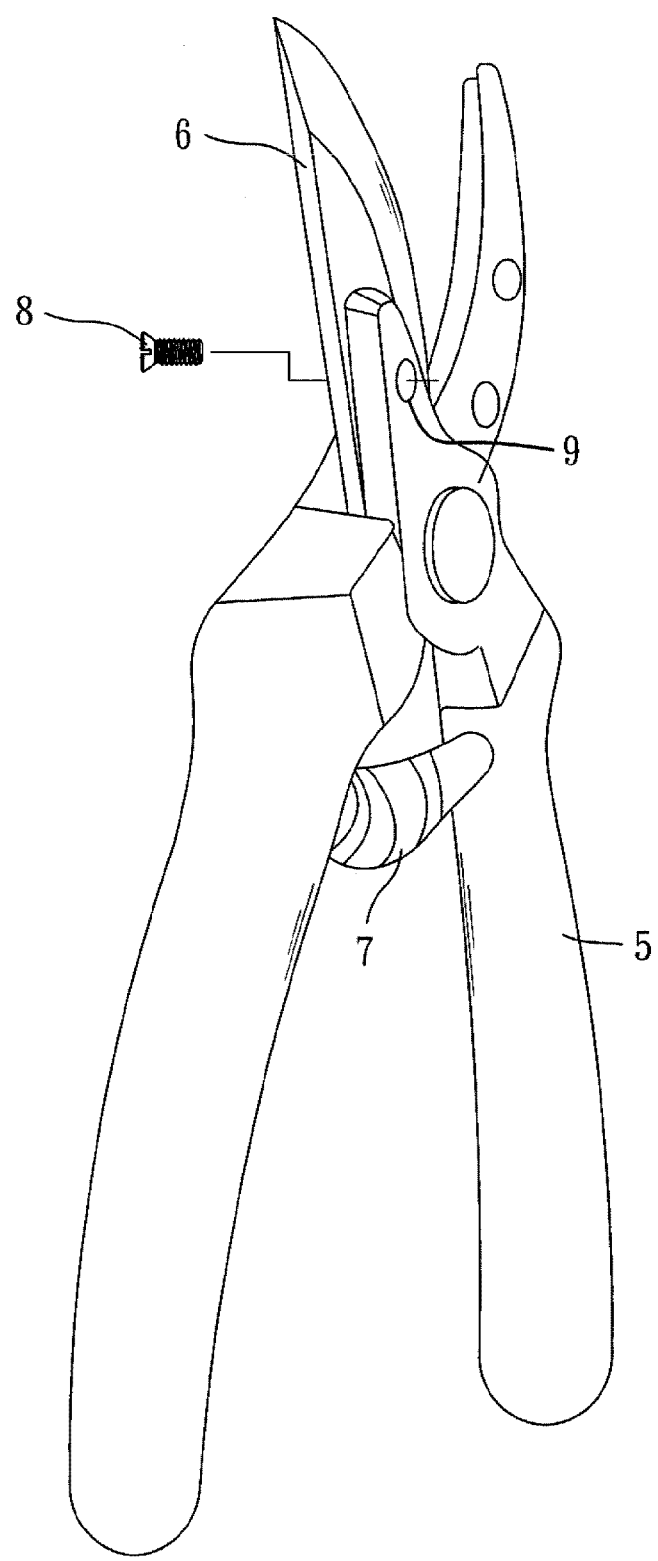
FIG. 2 is a perspective view of another conventional pruning shears in an open position.
Figure 3:
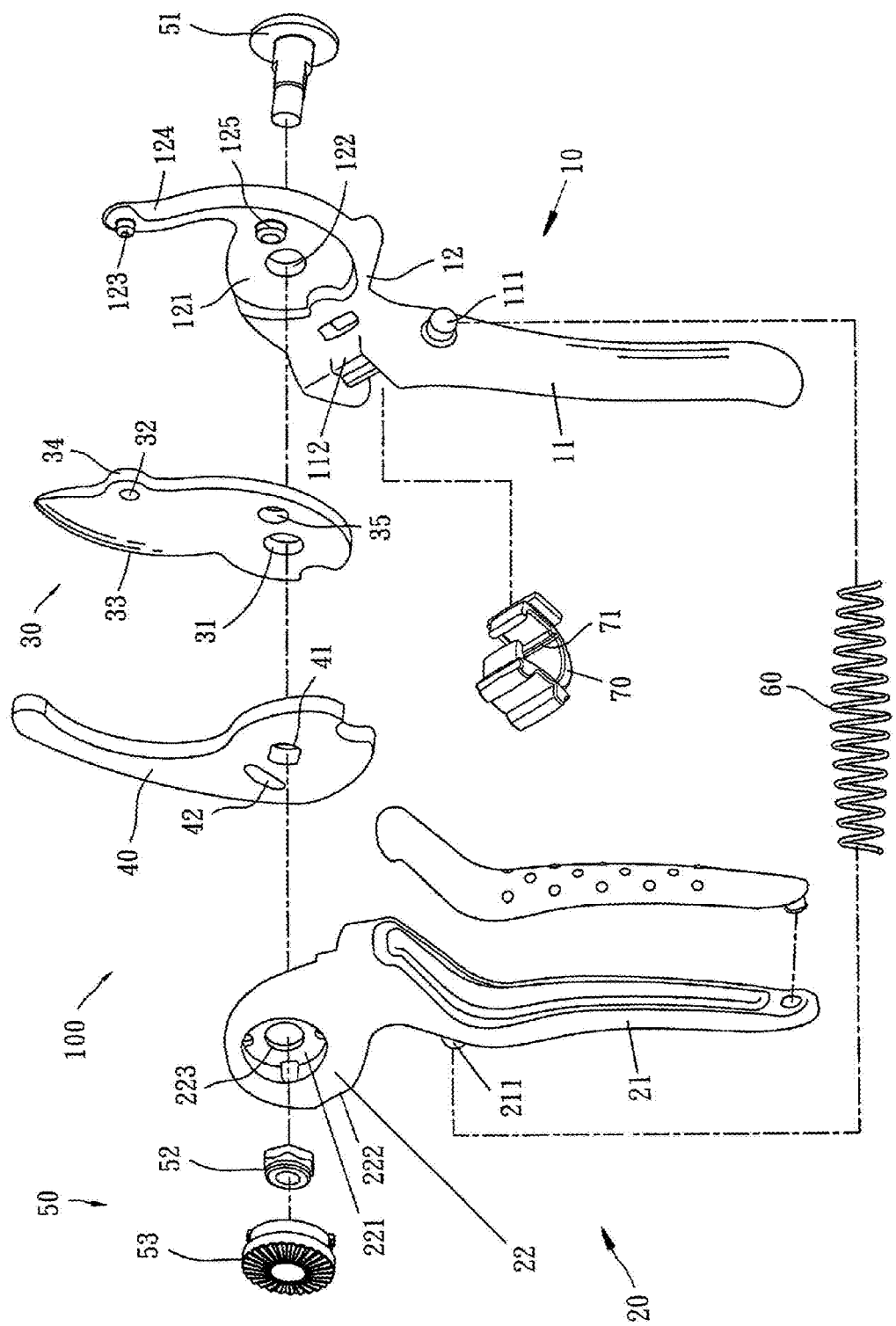
FIG. 3 is an exploded view of a preferred embodiment of pruning shears according to the invention.
Figure 4:
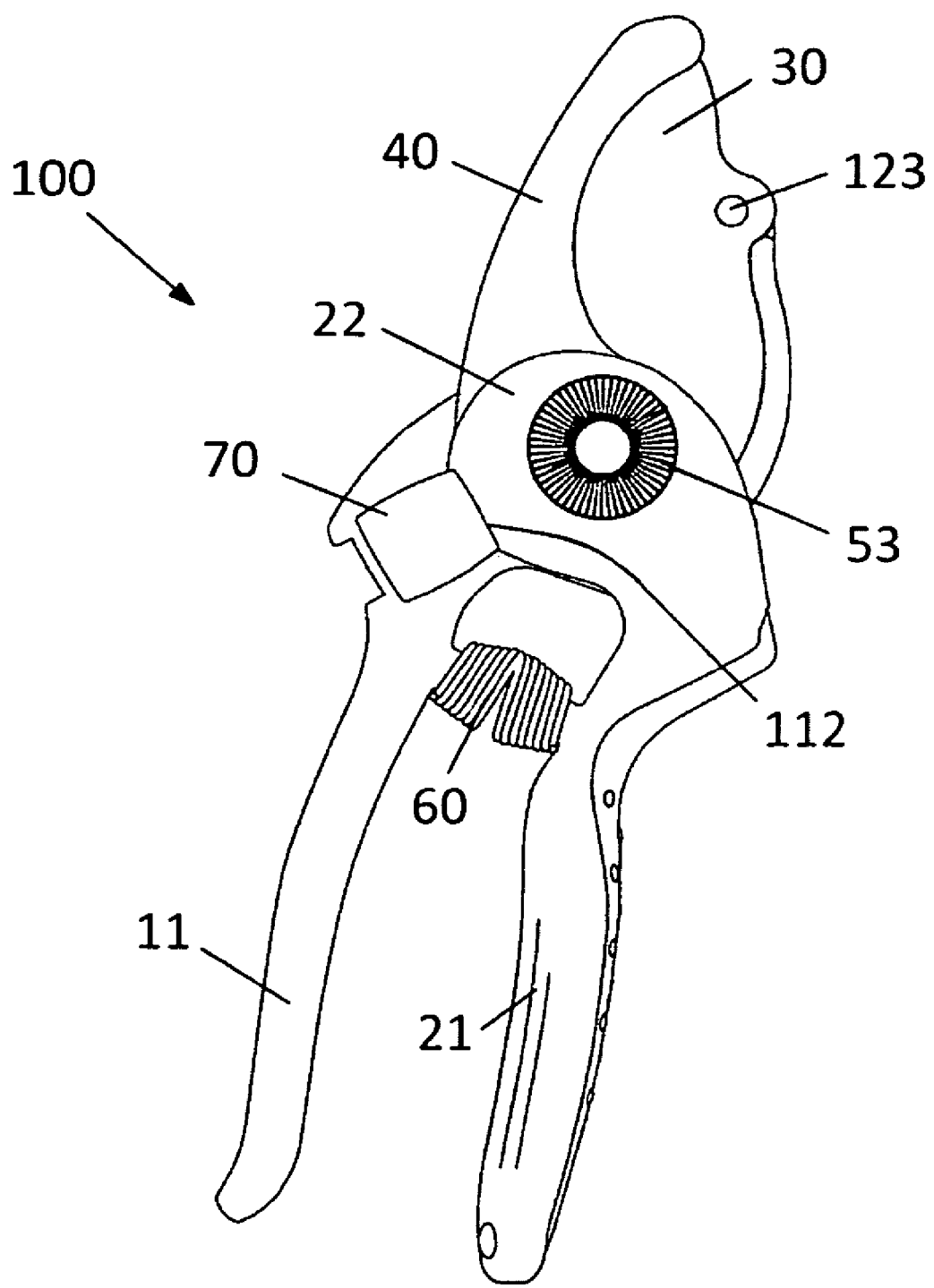
FIG. 4 is a side elevation of the assembled pruning shears shown in FIG. 3 where the shears are in a closed position.

Referring to FIGS. 3 and 4, a pair of pruning shears in accordance with a preferred embodiment of the invention is generally designated by numeral 100. The shears 100 comprise the following components as discussed in detail below.

A first arm 10 comprises a first handle 11 and an integral jaw 12. The first handle 11 has a cylindrical projection 111 projecting inward proximate to the jaw 12, and a latch cavity 112 at the joining portion of the first handle 11 and the jaw 12.

The jaw 12 comprises a flat recess 121 on the inner surface, an aperture 122 through the recess 121, a second tab 125 proximate to the aperture 122, an arm-shaped actuating section 124, and a first tab 123 at one end of the actuating section 124.

A second arm 20 comprises a second handle 21 and a joining section 22 integrally formed at one end of the second handle 21. The second handle 21 comprises a cylindrical protrusion 211 projecting toward the projection 111.

The joining section 22 comprises a circular through hole 221, a protuberance 223 of rectangular section besides the through hole 221, and a trough 222 on an edge facing the first arm 10. A first blade 30 comprises a hole 31 at one end, an ear 34 on the periphery proximate to the other end, the ear 34 having a first through hole 32, a second through hole 35 besides the hole 31, and a cutting edge 33 opposite the ear 34. The first blade 30 is shaped to fit on the recess 121 with the first tab 123 inserted into the first through hole 32 and fastened thereinto, the second tab 125 inserted into the second through hole 35 and fastened thereinto, and the hole 31 aligned with the aperture 122. A second blade 40 comprises a second pivot hole 41 aligned with both the hole 31 and the through hole 221, and a slot 42 besides the second pivot hole 41. The protuberance 223 can be fitted into the slot 42 in order to secure the second arm 20 to the second blade 40.

A pivot joint 50 comprises a pivot pin 51, a sleeve 52 disposed in the through hole 221, and a cup-shaped cap 53 securely fitted onto the sleeve 52 in the through hole 221. The pivot pin 51 is adapted to insert through the aperture 122, the hole 31, the second pivot hole 41, the through hole 221, and the sleeve 52 into the cap 53 to pivotably secure the first arm 10, the first blade 30, the second blade 40, and the second arm 20 together.

A torsion spring 60 has one end securely put on the projection 111 and the other end securely put on the protrusion 211 so that the spring 60 can exert an expansion force to push the first arm 10 and the second arm 20 apart from each other until the first blade 30 and the second blade 40 engaged together. Thus, a gap may exist between the cutting edge 33 and the second blade 40.

A locking member 70 has two parallel latches 71 extending from an inner surface. The latches 71 are fitted in the latch cavity 112 to pivotably mount the locking member 70 therein. The locking member 70 can limit the pivotal movement of the first arm 10 about the second arm 20. Moreover, the first blade 30 and the second blade 40 can be maintained in a partial covering relationship. Further, the cutting edge 33 is prevented from being exposed.

For storing the shears 100, an individual may hold the arms 10, 20 toward each other with the spring 60 being compressed. Further, push the locking member 70 toward the blades 30, 40 until the latches 71 are lockingly engaged with the trough 222. In this position, the shears 100 are locked. To the contrary, the individual may disengage the latches 71 from the trough 222 by pulling the locking member 70 prior to using the shears 100.

The invention has the following characteristics and advantages. The first tab 123 is inserted into the first through hole 32 and fastened thereinto and the second tab 125 inserted into the second through hole 35 and fastened thereinto. Thus, the first blade 30 is seated upon the flat recess 121 and has a portion of one edge opposing the cutting edge 33 urged by an inner surface of the actuating section 124 (i.e., the actuating section 124 being opposite the cutting edge 33). Hence, the first arm 10 is fastened by the first blade 30. Structural strength of the first blade 30 is not decreased because there is no hole or cavity formed therein. Thus, the structural strength of the first blade 30 is greatly increased and a prolonged period of use time is obtained.

Further, the first blade 30 is positioned on the flat recess 121 and a great portion of one edge of the first blade 30 opposite the cutting edge 33 is confined by the actuating section 124. Hence, the cut plant may not interfere with the first and second arms 10 and 20 in a cutting operation. Hence, the cutting operation can be performed smoothly. It is contemplated by the invention that force exerted upon the first and second arms 10 and 20 will be completely transmitted to the cutting edge 33. Therefore, the cutting edge 33 (i.e., the first blade 30) can smoothly cut a plant material.

While the invention herein disclosed has been described by means of specific embodiments, numerous modifications and variations could be made thereto by those skilled in the art without departing from the scope and spirit of the invention set forth in the claims.

What is claimed is:

1. Pruning shears (100) comprising:
   a first arm (10) comprising a first handle (11) and an integral jaw (12) including a first tab (123);
   a first blade (30) including a cutting edge (33) and an ear (34) on an edge opposite the cutting edge (33), the ear (34) including a first through hole (32) wherein the first arm (10) and the first blade (30) are secured together by inserting the first tab (123) into the first through hole (32);
   a second arm (20) comprising a second handle (21) and an integral joining section (22);
   a second blade (40) secured to the joining section (22) and being disposed on the cutting edge (33) in an inoperative position of the shears (100);
   a pivot joint (50) for pivotably securing the first arm (10) to the second arm (20); and
   a torsion spring (60) positioned between the first arm (10) and the second arm (20),
   wherein the torsion spring (60) exerts an expansion force to push the first arm (10) and the second arm (20) apart from each other;
   wherein the first handle (11) comprises a cylindrical projection (111), wherein the second handle (21) comprises a cylindrical protrusion (211) projecting toward the projection (111), and wherein the torsion spring (60) has one end securely put on the projection (111) and the other end securely put on the protrusion (211);
   wherein the jaw (12) comprises a flat recess (121) and an arm-shaped actuating section (124) extending from the flat recess (121), and wherein the first blade (30) is seated upon the flat recess (121); and
   wherein the first tab (123) is formed on the actuating section (124).

2. The pruning shears (100) of claim 1, further comprising a locking member (70) including two latches (71) extending from an inner surface, and wherein the first handle (11) comprises a latch cavity (112) at the joining portion of the first handle (11) and the jaw (12), the latch cavity (112) being adapted to pivotably receive the latches (71) so that the locking member (70) pivotably mounts in the latch cavity (112) for limiting a pivotal movement of the first arm (10) about the second arm (20) and maintaining the first blade (30) and the second blade (40) in a partial covering relationship.

3. The pruning shears (100) of claim 1, wherein the flat recess (121) comprises a second tab (125) and a through aperture (122) proximate to the second tab (125), and wherein the first blade (30) further comprises a second through hole (31) aligned with the through aperture (122), and a third through hole (35) besides the second through hole (31) with the second tab (125) fastened therein.

4. The pruning shears (100) of claim 1, wherein the first blade (30) is opposite the actuating section (124).

* * * * *